United States Patent Office 3,161,702
Patented Dec. 15, 1964

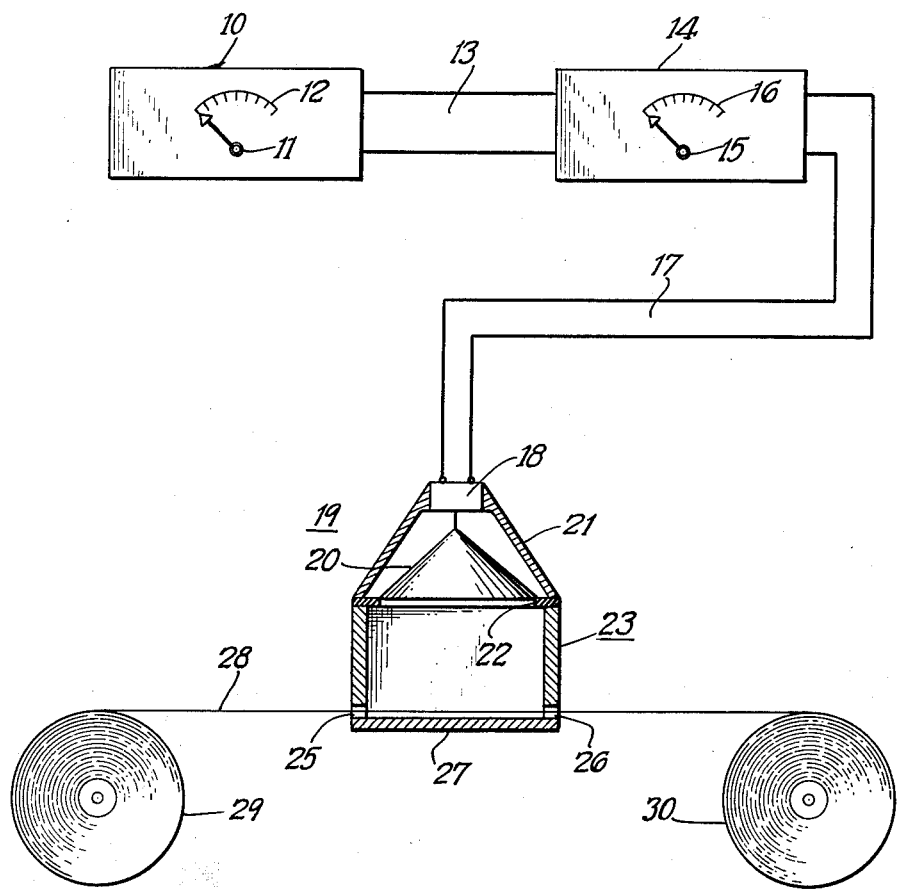

3,161,702
PROCESS FOR RENDERING POLYMERIC SURFACE ADHERENT TO A COATING
Thomas Gerald Howington, Pensacola, Fla., assignor to St. Regis Paper Company, New York, N.Y., a corporation of New York
Filed Jan. 4, 1962, Ser. No. 164,346
4 Claims. (Cl. 264—23)

This invention pertains to methods of imparting to surfaces which are normally non-adherent to adhesives, inks, coloring matter, printed designs and the like, a high degree of adherency thereto.

The invention more particularly pertains to methods of imparting to normally non-adherent plastic surfaces, a high degree of bonding and adherency to adhesives, printed matter and the like.

It is known that the surfaces of many types of materials or bodies, particularly when composed of certain plastics, are relatively non-adherent to inks, adhesives, printed matter, coloring matter and many other materials, which upon application to such surfaces are found gradually to disintegrate or fall away or are easily rubbed off.

An outstanding example of a polymeric plastic having such non-adherent surfaces when formed into articles, is polyethylene. Others are polypropylene and copolymers thereof with polyethylene, or any of them interpolymerized or blended with other polymers in minor amounts such as the various vinyl resins; also vinylidine chloride, polystyrene, nylon, etc.

Irrespective of any particular plastic or polymeric material the surfaces of which when formed into articles, are found to be non-adherent or insufficiently adherent to adhesives, inks, printed designs or indicia and the like, the present invention provides methods of rendering such surfaces highly adherent thereto.

Heretofore, a tremendous amount of research effort has been directed to devising treatments that will so modify the molecular, chemical or physical structure of articles composed of or coated with such non-adherent plastic materials as to impart to the plastic surface areas the property of adherently bonding to and retaining applications of glue, printed indicia and the like, without, however impairing the otherwise excellent properties of many of such plastics, such as example as chemical inertness, imperviousness to moisture penetration, etc., in the case of polyethylene, polypropylene, nylon, etc.

The most effective treatment which has heretofore been devised as commercially acceptable for such purpose, is that of electronic bombardment, effected by means of the well known corona or brush discharge phenomenon. This technique is difficult to apply to the surfaces, or to all surfaces, of blown or molded plastic products, particularly of odd or irregular shapes, and is best applied to the surface treatment of flexible sheet stock composed of or coated with non-adherent plastics and the like. Also this technique is objectionable in that it requires the generation of high frequency electrical currents at high voltages on the order of 10,000 volts, requiring expensive high voltage generating apparatus and protective equipment for minimizing hazards to the operating personnel. Also required are specially constructed, grounded feed rolls or belts over which the sheet stock or other articles to be treated, are fed past the corona discharge apparatus for treatment, these rolls or belts requiring an electrically insulative surface coating of a suitable plastic, which is adherently bonded to a metal base, and which desirably is not ruptured by the electronic bombardment. In practice, however, such rupturing often occurs requiring frequent shutdowns for repairs or replacements.

Now I have discovered in accordance with the present invention, that the aforesaid limitations and objections to the electronic bombardment treatment may be overcome in a simple and effective manner. In accordance with my invention I have found that excellent glueability and printability are imparted to articles composed of or coated with the aforesaid and related plastic polymers, by subjecting the surfaces of such articles to high frequency mechanical vibration, as by means of sonic or super-sonic waves, transmitted thereto through the atmosphere or through other gaseous, liquid or even solid media capable of mechanical wave transmission.

My experiments have shown that there is a rather critical lower limit as to frequency for such mechanical vibrations or wave motion treatment, below which such treatment is relatively ineffective and above which it is highly effective in imparting to the plastic or other non-adhering surfaces treated, the property of adherently bonding to and retaining applications of adhesives, printing matter and the like.

The lower frequency limit I have found to be most highly effective, is about 23,000 cycles per second (c.p.s.), although lower frequencies may be employed with, however, diminishing effectiveness, a practical lower limit being about 20,000 c.p.s. There appears to be no critical upper limit as to frequency at which such treatment becomes ineffective, ultra sonic frequencies up to as high as about 100,000 c.p.s. having been found operative. I have found, however, that such treatments are most highly effective in the frequency range of about 23,000 to 26,000 c.p.s.

Having thus described my invention in general terms, reference will now be had for a more detailed description to the single figure of the accompanying drawing comprising a more or less diagrammatic or schematic showing of an appropriate form of apparatus for practicing the invention.

Referring to the drawing, the apparatus therein shown comprises a high frequency electrical oscillation generator 10, of conventional and well known construction, which is provided with an adjustable control 11, for adjusting the oscillation frequency throughout a desired range, as indicated on the scale 12. The oscillator output is connected over a pair of leads 13, to the input of an amplifier 14, likewise of conventional and standard construction, requiring no detailed description, and provided with an adjustable gain control 15, operating over a scale 16. The output from amplifier 14 is connected over a pair of leads 17 to the actuating coil 18 of a loudspeaker unit 19, having a diaphragm 20 for generating mechanical waves propagated through the atmosphere. The diaphragm is enclosed in a housing 21, open at the base as at 22, for transmission of said waves, the housing resting on an enclosure housing 23, open at the top for propagation of the said waves from the diaphragm to the housing interior. The housing is provided with slots in its opposite walls, as at 25, 26, adjacent its base 27, for passage through the housing 23, of a plastic or plastic coated strip 28, to be treated. The strip is progressively fed from a roll 29 thence through the housing slots 25, 26, and onto a wind-up roll 30, preferably driven.

In the operation of the apparatus the oscillator 10 is adjusted by means of the control 11, to an appropriate frequency, for example, about 23,000 c.p.s. or higher, effective for treating the strip 28, and the gain control 15 of the amplifier 14 is set to amplify the oscillator output to a desired level for energizing the loudspeaker 19. As the strip 28 is fed through the housing 23, the atmospheric waves produced by the speaker diaphragm 20, at the aforesaid frequency as set by the oscillator, cause waves of this frequency to impinge on the strip material 28 for imparting to the plastic surface the property of adherently retaining applications thereto of adhesives, inks or other coloring materials, printed matter, etc.

In a series of tests run with an apparatus according to the drawing, an amplifier 14 was employed having a maximum output of 150 watts. The amplifier was connected to a loudspeaker 19 having a cone diaphragm 20 of 12 inches in diameter, the speaker having a frequency response extending from about 30 up to 70,000 c.p.s. During all tests the amplifier gain was set at the maximum of 150 watts output.

Samples of polyethylene coated kraft paper, coated with 5 pounds of polyethylene per ream of paper were employed for running a series of tests. The testing procedure consisted in inserting a so-coated paper sample into the housing 23, through one of the slots 25, 26, with the polyethylene coated surface facing upward toward the speaker diaphragm 20 and subjecting to an appropriate high frequency atmospheric wave treatment. A series of tests were run in this manner on successive samples, with the oscillator 10 set for frequencies ranging from 5,000 to 26,000 c.p.s. at intervals of 1,000 c.p.s. or so. The individual samples were exposed to the waves from the speaker for periods fifteen seconds each.

The thus treated samples were then subjected to adhesive tests by application of glue to determine the adherence of the glue to the so-treated polyethylene coatings. These tests established 100% highly adherent glueability for the samples treated in the frequency range extending from 23,000 to 26,000 c.p.s., but with, however, lesser adherence of the glue at lower frequencies.

The invention is not limited to the treatment of sheet stock, but is applicable to extruded, molded or blown articles of any shape, such as plates, bottles, containers, of any size or shape, etc. This is accomplished by placing such articles within a housing such as 23 of the apparatus shown in the drawing and subjecting to the sonic wave treatment from the speaker unit 19.

The invention is of general applicability to the treatment of plastic materials in general which in the untreated condition do not bond well to adhesives, inks or other coloring materials, printed matter, etc.

My investigations to date have not established what changes in surface structure of the treated material result in converting the same from relatively non-adherent to highly adherent with respect to adhesives, printed matter and the like. To the naked eye there is no observable change in structure of the treated material, the desirable properties of which in other respects are unaffected by the treatment. Without being bound to any particular theory as to the phenomenon involved, one possibility is that the frequencies at which the aforesaid mechanical wave treatment is most effective, are at or sufficiently close to the resonance frequency or frequencies of the linked molecules or radicals of which the material is comprised, that certain of the linkages are ruptured in the surface areas, to form points of attachment for the adhesives, inks or the like, thereby to provide the observed bonding action.

What is claimed is:

1. The method of treating a surface of a polymeric material which is relatively non-adherent to adhesives, inks, printed matter and the like, for imparting a high degree of adherency of such surface thereto, said material consisting at least predominantly of a polymer selected from the group consisting of a polyethylene, polypropylene and copolymers thereof, said method comprising: subjecting said surface, immersed in a fluid medium, to mechanical waves transmitted thereto through said medium at a frequency of at least 20,000 cycles per second and at a power level of about 150 watts for about 15 seconds so as to impart said adherency to said surface.

2. The method of treating a surface of a polymeric material which is relatively non-adherent to adhesives, inks, printed matter and the like for imparting a high degree of adherency of such surface thereto, said material consisting at least predominantly of the polymer selected from the group consisting of a polyethylene, polypropylene and copolymers thereof, said method comprising: subjecting said surface, immersed in a fluid medium, to mechanical waves transmitted thereto through said medium at a frequency of about 23,000 to 26,000 cycles per second at a power level of about 150 watts for about 15 seconds duration.

3. The method of treating a surface consisting at least predominantly of a polymeric material selected from the group consisting of polyethylene, polypropylene and copolymers thereof and which is relatively non-adherent to adhesives, inks, printed matter and the like for imparting a high degree of adherency of such surface thereto, said method comprising: generating acoustical waves in the atmosphere at a frequency of at least 20,000 cycles per second, and transmitting said waves to said surface for a duration of about 15 seconds and an intensity corresponding to approximately 150 watts so as to impart said adherency.

4. The method of treating a surface consisting at least predominantly of a polymeric material selected from the group consisting of polyethylene, polypropylene and copolymers thereof and which is relatively non-adherent to adhesives, inks, printed matter and the like for imparting a high degree of adherency of such surface thereto, said method comprising: generating acoustical waves at a frequency of about 23,000 to 26,000 cycles per second, and causing said waves to impinge on said surface at an intensity corresponding to about 150 watts for a duration of approximately 15 seconds so as to impart said adherency.

References Cited by the Examiner

UNITED STATES PATENTS

| | | |
|---|---|---|
| 2,484,014 | 10/49 | Peterson et al. |
| 2,522,082 | 9/50 | Arnold _____ 264—22 |
| 2,800,682 | 7/57 | Dooley. |
| 2,878,519 | 3/59 | Wolinski. |
| 2,954,271 | 9/60 | Cenzato. |
| 3,008,886 | 11/61 | Sarantites. |

FOREIGN PATENTS 868,597    5/61    Great Britain.

ALEXANDER H. BRODMERKEL, *Primary Examiner.*

MICHAEL V. BRINDISI, *Examiner.*